United States Patent
Giesselmann et al.

(10) Patent No.: US 9,996,318 B2
(45) Date of Patent: Jun. 12, 2018

(54) FIFO MEMORY HAVING A MEMORY REGION MODIFIABLE DURING OPERATION

(71) Applicant: Robert Bosch GmbH, Stuttgart (DE)

(72) Inventors: Timo Giesselmann, Stuttgart (DE); Konstantin Buck, Eningen U.A. (DE); Rainer Dorsch, Dettenhausen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 157 days.

(21) Appl. No.: 15/157,989

(22) Filed: May 18, 2016

(65) Prior Publication Data
US 2016/0342390 A1 Nov. 24, 2016

(30) Foreign Application Priority Data
May 22, 2015 (DE) .................. 10 2015 209 486

(51) Int. Cl.
*G06F 5/14* (2006.01)
*G06F 5/06* (2006.01)

(52) U.S. Cl.
CPC .............. *G06F 5/06* (2013.01); *G06F 5/065* (2013.01); *G06F 5/14* (2013.01); *G06F 2205/063* (2013.01); *G06F 2205/066* (2013.01); *G06F 2205/126* (2013.01)

(58) Field of Classification Search
CPC ...... G06F 5/065; G06F 5/14; G06F 2205/126; G06F 2205/066
See application file for complete search history.

(56) References Cited

U.S. PATENT DOCUMENTS

| 6,441,917 | B1 * | 8/2002 | Ikeda | G06F 5/065 358/1.16 |
| 7,196,710 | B1 * | 3/2007 | Fouladi | G06F 3/14 345/501 |
| 2003/0120886 | A1 * | 6/2003 | Moller | G06F 5/065 711/173 |
| 2005/0060512 | A1 * | 3/2005 | Underbrink | G01S 19/37 711/170 |
| 2007/0274303 | A1 * | 11/2007 | Cui | G06F 12/023 370/363 |

(Continued)

OTHER PUBLICATIONS

"Circular buffer", article obtained from Wikipedia http://en.wikipedia.org/wiki/Circular_buffer, (2016).

(Continued)

*Primary Examiner* — Glenn A Auve
(74) *Attorney, Agent, or Firm* — Norton Rose Fulbright US LLP; Gerard Messina

(57) ABSTRACT

A FIFO memory having a modifiable memory region; the FIFO memory being configured as a linear memory and as a circular buffer; the FIFO memory having a state machine that contains a new base value and a new top value for definition of a memory region allocated in the future, the lower boundary of which region is defined by the new base value and the upper boundary of which is defined by the new top value, and the state machine is configured in such a way that in a read mode and/or a write mode of the FIFO memory, the allocated memory region of the FIFO memory is modifiable by shifting the base pointer to the new base value, and/or by shifting the top pointer to the new top value.

5 Claims, 2 Drawing Sheets

(56) References Cited

U.S. PATENT DOCUMENTS

2010/0180095 A1* 7/2010 Fujibayashi .............. G06F 5/14
711/163

OTHER PUBLICATIONS

"Efficient algorithm for expanding circular buffers", article obtained from Labix Blog http://blog.labix.org/2010/12/23/efficient-algorithm-for-expanding-circular-buffers, (2010).

* cited by examiner

FIFO MEMORY HAVING A MEMORY REGION MODIFIABLE DURING OPERATION

CROSS REFERENCE

The present application claims the benefit under 35 U.S.C. 119 of German Patent Application No. DE 102015209486.3 filed on May 22, 2015, which is expressly incorporated herein by reference in its entirety.

BACKGROUND INFORMATION

The present invention relates to a FIFO memory having a modifiable memory region; the FIFO memory being configured as a linear memory; the FIFO memory being configured as a circular buffer; the FIFO memory having a state machine that contains a base pointer "base," a top pointer "top," a write pointer "wr," and a read pointer "rd"; the FIFO memory containing a currently allocated memory region whose lower boundary is defined by the base pointer "base" and whose upper boundary is defined by the top pointer "top"; the write pointer "wr" defining the current write address and the read pointer "rd" defining the current read address.

A FIFO is usually implemented as a circular buffer having a fixed size, and can contain a specific number of data elements:

http://en.wikipedia.org/wiki/Circular_buffer

If more memory is required than is configured for the circular buffer, there are two methods for dealing with this:
1. New data elements cannot be accepted into the circular buffer.
2. New data elements are written into the circular buffer after the oldest elements are deleted from the buffer.

This entails losing either new data (1.) or data history (2.). If neither of the two methods is acceptable, the buffer must be enlarged.

Most methods for changing FIFO sizes refer to software implementations in which buffers in the memory are reallocated or the buffer contents are copied over from a small buffer into a larger one. The mechanisms used here are ones that are not available, or are inefficient and cumbersome, in a hardware implementation.

Another conventional approach uses a standard region and an expansion region in the memory. If the FIFO needs to be enlarged, data are first written into the expansion region so that at the next pass, that region can be integrated into the standard region. See, for example:

http://blog.labix.org/2010/12/23/efficient-algorithm-for-expanding-circular-buffers

SUMMARY

The present invention makes it possible
1. to make a FIFO larger or smaller during operation.
2. The existing memory region is intended to be expanded or shrunk downward or upward.
3. Data elements that are contained in the memory are not to be lost, and are to be capable of continuing to be read in/out in the same sequence.

The present invention proceeds from a FIFO memory having a modifiable memory region; the FIFO memory being configured as a linear memory; the FIFO memory being configured as a circular buffer; the FIFO memory having a state machine that contains a base pointer "base," a top pointer "top," a write pointer "wr," and a read pointer "rd"; the FIFO memory containing a currently allocated memory region whose lower boundary is defined by the base pointer "base" and whose upper boundary is defined by the top pointer "top"; the write pointer "wr" defining the current write address and the read pointer "rd" defining the current read address. The essence of the invention is that the state machine contains values "new_base" and "new_top" for definition of a memory region allocated in the future, the lower boundary of which region is defined by the value "new_base" and the upper boundary of which is defined by the value "new_top," and the state machine being configured in such a way that in a read mode and/or a write mode of the FIFO memory, the allocated memory region of the FIFO memory is modifiable by shifting the base pointer "base" to the value "new_base," and/or by shifting the top pointer "top" to the value "new_top." According to the present invention, therefore, a pointer ("base," "top") and a shadow pointer (new value: "new_base," "new_top") is respectively provided at the top and bottom end of the memory region, with which pointers the new modified memory region is first defined and is fixed at a suitable point in time.

An advantageous embodiment of the present invention provides that the FIFO memory has an unoccupied region in which no unread data are present, and the state machine is configured in such a way that the point in time selected for setting the base pointer "base" and/or the top pointer "top" to the values "new_base" and/or "new_top" is one at which both the old and the new value of the pointer are located in the unoccupied region.

An advantageous embodiment of the present invention provides that the state machine is configured in such a way that the shifting of the top pointer "top" to the value "new_top" occurs when the read pointer "rd"="base."

An advantageous embodiment of the present invention provides that the state machine is configured in such a way that the shifting of the base pointer "base" to the value "new_base" occurs when the write pointer "wr"="top."

Advantages of the example embodiment may include:
1. Implementation in hardware is possible with limited means (especially memory).
2. Operation of the FIFO can be sustained while the change in size is taking place.
3. Real-time requirements in terms of writing and reading can be complied with, since the FIFO does not need to be blocked for any copying operations in the context of a size change.

The present invention can be used particularly advantageously in the context of a smartphone having an Android operating system, and therein for so-called "batching" of sensor data. Multiple FIFOs are utilized therein for the various sensors. The invention makes it possible to enlarge or shrink the memory for each of these FIFOs during operation, and to furnish memory for FIFOs that are required or no longer required and integrate it into other FIFOs.

The present invention is more efficient because it avoids pointer management for the expansion region and permits enlargement in advance (i.e., before the memory fills up) before the standard region is exhausted.

An Android prerequisite, e.g., that all sensors continue to supply their data continuously in the context of a mode switchover during operation, is complied with because no data are lost as a result of the change in size.

DETAILED DESCRIPTION OF EXAMPLE EMBODIMENTS

As in the conventional implementation of a FIFO, the circular buffer is permanently allocated in a linear memory and its boundaries are defined by two address pointers "base" and "top." There is furthermore an address pointer "wr" for the position starting at which new data elements can be inserted, and an address pointer "rd" for the position starting at which data elements can be read out.

Upon initialization:
1. "base" is set to the bottom end of the memory region; and
2. "top" is set to the top end of the memory region.
3. The write pointer "wr" and the read pointer "rd" are set to "base."

New data elements are written into the memory at the current address of "wr."
1. "wr" is then incremented;
2. when "wr" reaches the value "top," "wr" is set to "base" (wraparound).

Data elements are read out from the address "rd."
1. "rd" is then incremented;
2. when "rd" reaches the value of "top," "rd" is set to "base" (wraparound).

Figure 1:
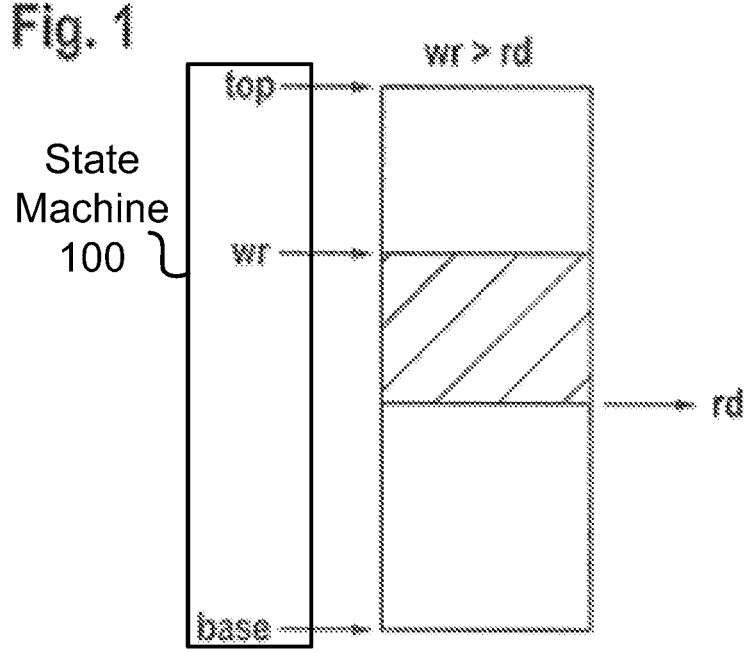
FIG. 1 shows a FIFO memory having an allocated memory region having a contiguous occupied region and a divided unoccupied region.

FIG. 1 shows a FIFO memory having an allocated memory region having a contiguous occupied region and a divided unoccupied region, and shows a state machine 100 with pointers pointing to respective locations of the FIFO memory.

Figure 2:
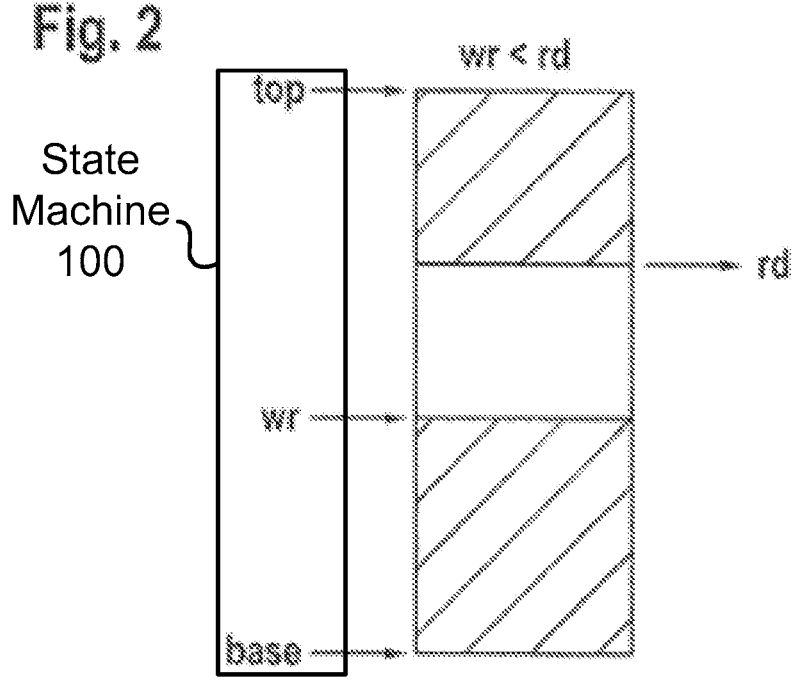
FIG. 2 shows a FIFO memory having an allocated memory region having a divided occupied region and a contiguous unoccupied region.

FIG. 2 shows a FIFO memory having an allocated memory region having a divided occupied region and a contiguous unoccupied region, and shows the state machine 100 with pointers pointing to respective locations of the FIFO memory.

The FIFO is characterized in that there exists in the memory region one part that contains current data and is thus occupied (shown with hatching in the Figures) and another part that is unoccupied (not hatched). Depending on the current position of the pointers "wr" and "rd," the following situations can occur:
1. "wr">"rd": the occupied region is present contiguously in the memory region (FIG. 1).
2. "wr"<"rd": the occupied region is subdivided into two parts, one at the lower end and one at the upper end of the memory region (FIG. 2).
3. "wr"="rd": in this special case the FIFO is empty and can be treated, in terms of further consideration, as if "wr">"rd."

In order to enable the change in size or change in location of the FIFO, the address pointers "new_base" and "new_top," which contain the target size or the new location of the FIFO after the change, are introduced according to the present invention (see FIG. 1).

A change in the "base" and "top" memory region boundaries is only possible if the position of the new pointers "new_base" and "new_top" is located outside the occupied region. While data are being written into and read out from the FIFO, the unoccupied region shifts in the opposite direction from the occupied region. The algorithm is based on the fact that the point in time selected for the modification of the "base" and "top" pointers is one at which both the old and the new value of the pointer are located in the unoccupied region.

It is generally possible to enlarge the FIFO. Shrinking it, however, is only possible if the fill level of the FIFO is lower than or equal to the new size of the FIFO. If the fill level is higher, it is then not possible to shrink the FIFO at that point in time. Possible embodiments for dealing with this case are described in variant 3.

Modifying "Top" and/or "Base"
1. The request to modify "top" is conveyed by setting "new_top" to a value not equal to "top." Alternatively or simultaneously, the modification of "base" is conveyed by setting "new_base" to a value not equal to "base."
2. The reading and writing of data elements continues as previously. At each update of "rd" or "wr" the following check is made:
IF ("rd"="base") (see FIG. 3)
IF ("new_top">"wr"): "top" is set to the value "new_top"
OTHERWISE: not possible to modify "top" at this time.
IF ("wr"="top") (see FIG. 4)
IF ("new_base"<"rd"): "base" is set to the value of "new_base"
OTHERWISE: not possible to modify "base" at this time.
3. The enlargement is complete when "top"="new_top" and "base"="new_base."

Figure 3:
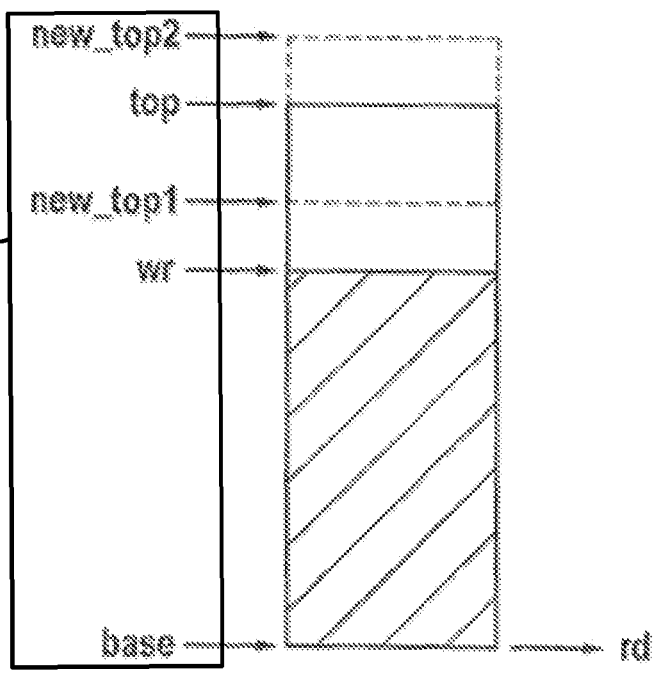
FIG. 3 shows a FIFO memory according to the present invention during operation, the read pointer "rd"="base" and the top pointer "top" being capable of being shrunk or enlarged.

FIG. 3 shows a FIFO memory according to the present invention during operation, and shows the state machine 100 with pointers pointing to respective locations of the FIFO memory, where the read pointer "rd"="base" and the top pointer "top" being capable of being shrunk or enlarged.

Selecting the point in time for modifying "top" (when "rd" reaches the value "base") ensures that the top region of the FIFO is unused and the new value of "top" does not disrupt the continuity of the FIFO contents. "new_top1" and "new_top2" show the cases of enlarging and shrinking "top."

Figure 4:
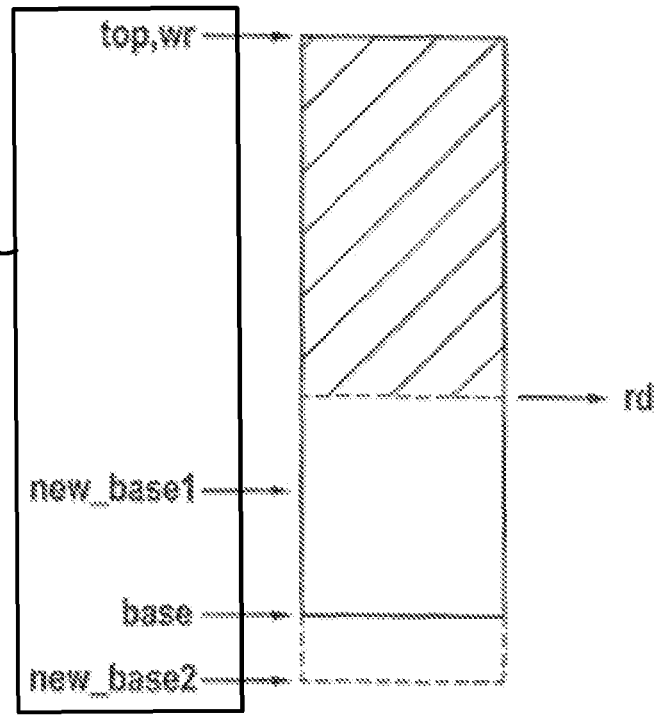
FIG. 4 shows a FIFO memory according to the present invention during operation, the write pointer "wr"="top" and the base pointer "base" being capable of being shrunk or enlarged.

Analogously thereto, selecting the point in time for modifying "base" ensures that the lower region of the FIFO is unused. FIG. 4 shows, in this connection, a FIFO memory according to the present invention during operation, and shows the state machine 100 with pointers pointing to respective locations of the FIFO memory, where the write pointer "wr"="op" and the base pointer "base" being capable of being shrunk or enlarged.

Variant 1 (Alternative to the Basic Variant)

As an alternative to incrementing the pointers "wr" and "rd," the FIFO can also be implemented with decrementing pointers. This is generally valid for any FIFO and also applies to this FIFO, although the points in time and the sequence of pointer updates must be correspondingly adapted.

Variant 2 (Improvement of the Basic Variant)

As compared with the simple control system (updating the pointer at the next wraparound), there is also the possibility of carrying out the update of the pointers immediately when certain conditions of the read and write pointers are met. What is relevant here in particular is whether the pointer "wr" is located below or above "rd," i.e., whether valid data are stored beyond the wraparound region.

1. The request to modify "top" is conveyed by setting "new_top" to a value not equal to "top."

Alternatively or simultaneously, the modification of "base" is conveyed by setting "new_base" to a value not equal to "base".

2. IF ("wr">"rd")
IF ("new_top">"wr"): "top" is set to the value of "new_top"
IF ("new_base"<"rd"): "base" is set to the value of "new_base"
OTHERWISE: (revert to the basic variant).

The writing and reading of data elements continues as previously. At each update of "rd" or "wr" the following check is made:
IF ("rd"="base")
IF ("new_top">"wr"): "top" is set to the value "new_top"
OTHERWISE: not possible to modify "top" at this time.
IF ("wr"="top")
IF ("new base"<"rd"): "base" is set to the value of "new_base"
OTHERWISE: not possible to modify "base" at this time.

3. The enlargement is complete when "top"="new_top" and "base"="new_base."

An advantage of this variant is that when the conditions are met, a change in size can be completed more quickly.

Variant 3 (Expansion of the Basic Variant or of Variants 1 and 2)

It was indicated above that a shrinkage of the FIFO is only possible if the fill level of the FIFO is lower than or equal to the new size of the FIFO. If this is not the case, the following possibilities exist:

1. Instead of waiting for a successful shrinkage that may never occur, the algorithm can alternatively be configured so that at the next pass of the pointers the FIFO is shrunk less than requested, and the shrinkage achieved is reported back.
2. A sufficient number of old values in the FIFO are discarded until a shrinkage is possible.
3. No new values are written into the FIFO until the fill level is low enough to enable a shrinkage (discarding new values)
4. The shrinkage request persists until the fill level of the FIFO is low enough.

LIST OF REFERENCE CHARACTERS

"base" base pointer
"top" top pointer
"wr" write pointer
"rd" read pointer
"new_base" new base value
"new_top" new top value

What is claimed is:

1. A FIFO memory, comprising:
a modifiable memory region, the FIFO memory being configured as a linear memory, and as a circular buffer; and
a state machine that includes a base pointer, a top pointer, a write pointer, and a read pointer, the FIFO memory containing a currently allocated memory region whose lower boundary is defined by the base pointer and whose upper boundary is defined by the top pointer, the write pointer defining a current write address and the read pointer defining a current read address, the state machine further including a new base value and a new top value for defining a memory region allocated in the future, a lower boundary of which region is defined by the new base value and an upper boundary of which is defined by the new top value;
wherein in at least one of a read mode of the FIFO memory and a write mode of the FIFO memory, the state machine is configured to modify an allocated memory region of the FIFO memory by at least one of:
for shifting the base pointer to the new base value when the new base value is at least as low as a location to which the read pointer is presently set:
determining, in a first determination, whether a first condition, that a location to which the write pointer is presently set equals a current value of the top pointer, is satisfied; and
performing the shifting of the base pointer to the new base value in response to a result of the first determination being that the first condition is satisfied; and
for shifting the top pointer to the new top value when the new top value is at least as high as the location to which the write pointer is presently set:
determining, in a second determination, whether a second condition, that the location to which the read pointer is presently set equals a current value of the base pointer, is satisfied; and
performing the shifting of the top pointer to the new top value in response to a result of the second determination being that the second condition is satisfied.

2. The FIFO memory as recited in claim 1, wherein the FIFO memory has an unoccupied region in which no unread data are present, and the state machine is configured in such a way that a point in time selected for setting the base pointer to the new base value is one at which both a previous value of the base pointer and the new base value of the base pointer are located in the unoccupied region.

3. The FIFO memory as recited in claim 1, wherein the state machine is configured to modify the allocated memory region by, for shifting the top pointer to the new top value when the new top value is at least as high as the location to which the write pointer is presently set:
determining, in the second determination, whether the second condition, that the location to which the read pointer is presently set equals the current value of the base pointer, is satisfied; and
performing the shifting of the top pointer to the new top value in response to the result of the second determination being that the second condition is satisfied.

4. The FIFO memory as recited in claim 1, wherein the state machine is configured to modify the allocated memory region by, for shifting the base pointer to the new base value when the new base value is at least as low as low as the location to which the base pointer is presently set:
determining, in the first determination, whether the first condition, that the location to which the write pointer is presently set equals the current value of the top pointer, is satisfied; and
performing the shifting of the base pointer to the new base value in response to the result of the first determination being that the first condition is satisfied.

5. The FIFO memory as recited in claim 1, wherein the FIFO memory has an unoccupied region in which no unread data are present, and the state machine is configured in such a way that a point in time selected for setting is one at which both a previous value of the top pointer and the new top value of the top pointer are located in the unoccupied region.

* * * * *